United States Patent [19]

Baum

[11] Patent Number: 4,776,158
[45] Date of Patent: Oct. 11, 1988

[54] SELF-CLEANING LEAF RAKE

[76] Inventor: Wendell E. Baum, 304 E. Manning, Ottumwa, Iowa 52501

[21] Appl. No.: 20,882

[22] Filed: Mar. 2, 1987

[51] Int. Cl.⁴ .............................................. A01D 7/10
[52] U.S. Cl. ............................. 56/400.08; 56/400.16; 294/50
[58] Field of Search ........... 56/400.03, 400.08, 400.09, 56/400.1, 400.16; 294/50, 50.5

[56] References Cited

U.S. PATENT DOCUMENTS

| 1,266,411 | 5/1918 | Cornwell | 56/400.10 |
| 1,879,112 | 9/1932 | Cress | 56/400.10 |
| 2,016,263 | 10/1935 | Beythan | 56/400.10 |
| 3,130,533 | 4/1964 | Huegel et al. | 56/400.10 |
| 3,884,023 | 5/1975 | Robinson | 294/50 |
| 4,603,744 | 8/1986 | Ramirez | 294/50 |

FOREIGN PATENT DOCUMENTS 1296608 12/1962 France .................. 294/50

Primary Examiner—John Weiss
Attorney, Agent, or Firm—Zarley, McKee, Thomte, Voorhees & Sease

[57] ABSTRACT

A conventional rake includes a stripper bar on the teeth which is movable by a push rod on the handle of the rake from a raised raking position to a lowered leaf push-off position. A spring clip holds the stripper bar in the raised position and may be assisted by a releasable guide element on the handle engaging the push rod.

9 Claims, 1 Drawing Sheet

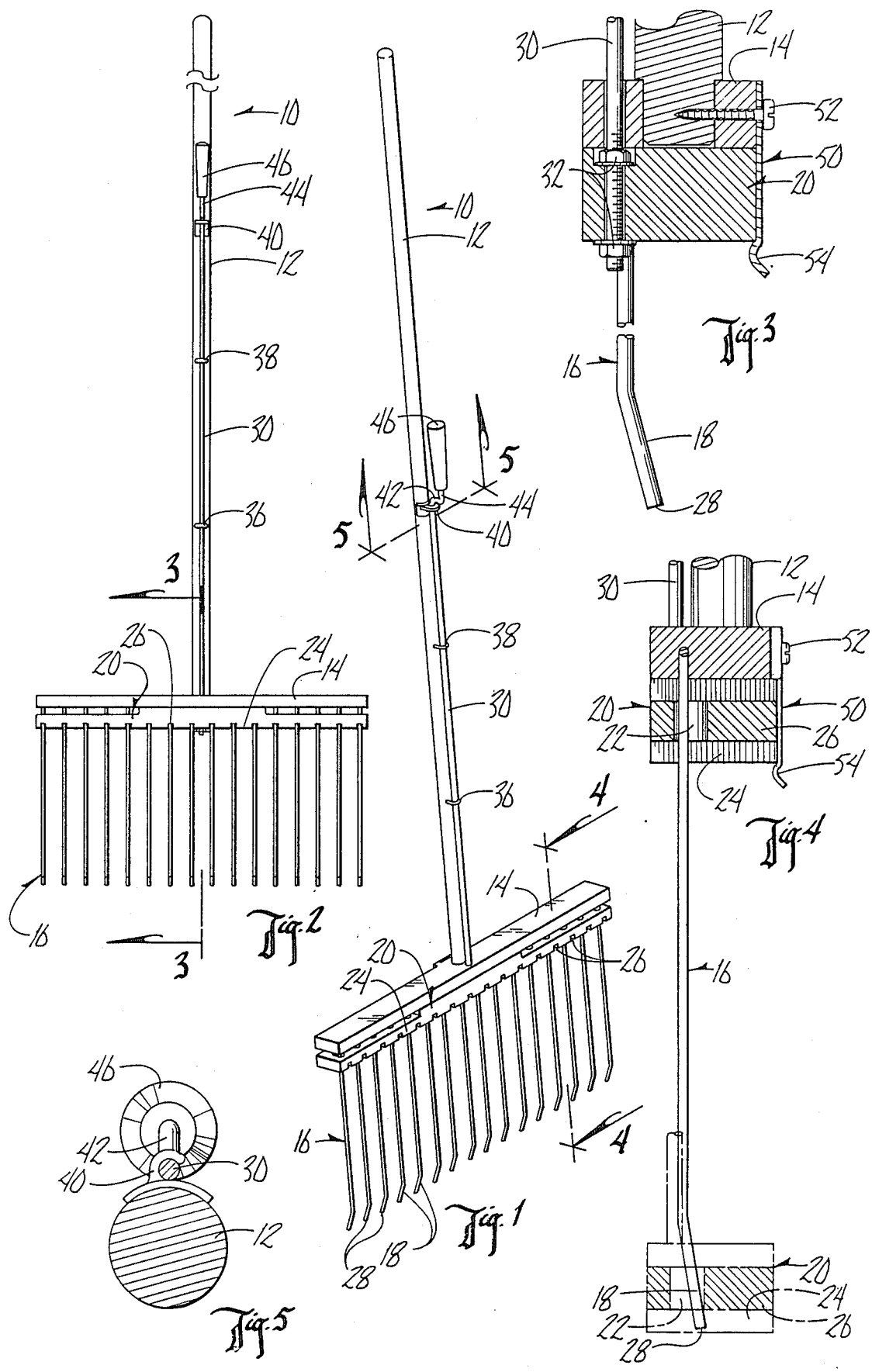

SELF-CLEANING LEAF RAKE

BACKGROUND OF THE INVENTION

The raking of leaves and grass clippings often result in the rake material becoming stuck on the teeth of the rake. This then requires the raking operation to be stopped and the rake inverted so that the material can be manually removed from the teeth whereby raking can then be resumed. If the rake is not cleaned it becomes ineffective for continued raking. The efficiency of the raking operation due to this problem is substantially reduced.

SUMMARY OF THE INVENTION

The self-cleaning leaf rake of this invention makes it possible to automatically remove the leaves and grass clippings that collect on the ends of the rake teeth. A pusher bar is carried on the teeth and is held in a position near the top of the teeth while the leaves are being raked and when the rake needs to be cleaned an actuator push rod on the handle of the rake is pushed down moving a stripper bar along the teeth to the bottom ends thereof cleaning the teeth as it moves all in one operation. The stripper bar is pulled back to its raking position at the top of the teeth and is held by a spring clip which engages the stripper bar and by a releasable guide element on the handle which engages the push rod. When the stripper bar is moved to its lowermost position its bottom face is lower than the ends of the teeth which extend through openings which are recessed upwardly in the stripper bar. The ends of the teeth never move inside of the openings in the stripper bar and thereby never become hung up when it is desired to return the stripper bar to its upper raking position.

DESCRIPTION OF THE DRAWINGS

FIG. 1 is a perspective view of the self-cleaning leaf rake of this invention.

FIG. 2 is an elevational view thereof.

FIG. 3 is a cross-sectional view taken along line 3—3 in FIG. 2.

FIG. 4 is a cross-sectional view taken along line 4—4 in FIG. 1 and showing the stripper bar in its lowered position.

FIG. 5 is a cross-sectional view taken along line 5—5 in FIG. 1.

DESCRIPTION OF THE PREFERRED EMBODIMENT

The self-cleaning leaf rake of this invention is referred to in FIG. 1 generally by the reference numeral 10 and includes an elongated handle 12 having a transversely extending bar 14 at its lower end which carries downwardly extending spaced apart teeth 16. The teeth 16 are of spring steel and have angled end portions 18.

A stripper bar 20 includes a series of openings 22 through which the teeth 16 extend. The bottom face 24 of the stripper bar 20 is recessed upwardly at 26 at the end of each opening 22 such that the lowermost end 28 of the end portions 18 are positioned upwardly of the bottom face of the stripper bar when in its lowered position, as shown by the dash lines in FIG. 4, but downwardly of the bottom of the recess 26. This assures that the leaves will be totally removed from the end portions 18 of the teeth 16 and that the ends 28 will not become hung up by engagement with the sidewalls of the openings 22 in the stripper bar 20.

A push rod 30 extends through the stripper bar 20 and is held in place by a pair of nuts 32. The push rod 30 then extends upwardly through the bar 14 and is held in place along the handle 12 by guides 36, 38 and 40. The rod terminates in an offset portion 42 which in turn merges into an upstanding portion 44 connected to a handle 46. The guide 40, as seen in FIG. 5, is C-shaped allowing disengagement with the rod 30 when the rod is moved laterally. This guide is positioned to engage the offset portion 42 to hold the stripper bar 20 in its raised position during the raking operation. The guide 38 is positioned to function as a stop when the push rod is moved downwardly to the position of the dash lines in FIG. 4.

A spring clip 50 is seen in FIG. 4 on the bar 14 held by a screw 52 and having a lower end 54 carrying a shoulder which engages the bottom surface 24 of the stripper bar 20 when the stripper bar is in its raised position. Downward pressure of the push rod on the stripper bar 20 causes disengagement with the clip 50 and return of the stripper bar 20 to its raised position automatically causing it to be reengaged and held in its raised position.

It is thus seen in operation that the self-cleaning leaf rake of this invention may be used as a conventional rake but will operate without becoming lodged with leaves and grass clippings since it merely requires a quick down and up movement of the push rod 30 which will dislodge the collected material from the end portions 18 of the teeth 16. It is accordingly seen that a major problem has been overcome by this invention by a simple modification to a conventional rake.

What is claimed is:

1. A self-cleaning leaf rake comprising:
a handle having a transversely extending bar at its lower end,
a plurality of spaced apart teeth extending downwardly from said bar;
a stripper member having a plurality of openings extending therethrough with said teeth being movably received in said openings,
a push rod connected to said stripper member for moving said stripper member the substantial length of said teeth between a raised position adjacent said bar and a lowered position adjacent the lower end of said teeth, and
said stripper member having a thickness at said openings less than the thickness adjacent thereto on either side whereby protruding portions are provided on the bottom side of said stripper member for pushing leaves off said teeth, said stripper member having front and rear sides and the thickness of said stripper member at said openings being the result of a plurality of separate channels being provided, one for each opening extending between the front and rear sides of said stripper member.

2. The structure of claim 1 wherein said pusher rod extends through said bar and upwardly along said handle.

3. The structure of claim 1 and a releasable means is carried on said bar for engaging said stripper member when in a raised position and holding it there during raking of leaves.

4. The structure of claim 1 and a stop means is provided on said handle for limiting the downward movement of said stripper bar to prevent its disengagement with said teeth.

5. The structure of claim 1 wherein when said stripper member is in its lowered position the ends of said teeth are positioned upwardly of the bottom surface of said protruding portions and downwardly of the bottom ends of said openings.

6. The structure of claim 2 wherein said handle is elongated and a first guide element is positioned on said handle for engagement with a cooperating means on the upper end of said push rod when said stripper member is in its lowered position to limit travel of said stripper member and prevent disengagement of said stripper member with said teeth.

7. The structure of claim 6 wherein a second guide element is provided on said handle above said first guide element and releasably engages said cooperating means on said push rod to hold said stripper member in a raised position during raking.

8. The structure of claim 6 wherein said second guide element is C-shaped and said push rod is flexible for deflection laterally for engagement and disengagement with said second guide element.

9. The structure of claim 1 wherein said push rod is connected to said stripper member substantially in the plane of said teeth whereby rotation of said stripper member about the longitudinal axis of said stripper member, and binding of said teeth is prevented as said push rod moves said stripper member between raised and lowered positions.

* * * * *